United States Patent
Wu et al.

(10) Patent No.: US 9,143,383 B2
(45) Date of Patent: Sep. 22, 2015

(54) METHOD AND SYSTEM FOR MANAGING DEVICE IDENTIFICATION

(71) Applicant: miiiCasa Taiwan Inc., Taipei (TW)

(72) Inventors: Min-Hui Wu, Taipei (TW); Yi-Hua Liang, Taipei (TW); Chi-Ming Luo, Taipei (TW); Yu-Sheng Lin, Taipei (TW)

(73) Assignee: miiiCasa Taiwan Inc., Taipei (TW)

( * ) Notice: Subject to any disclaimer, the term of this patent is extended or adjusted under 35 U.S.C. 154(b) by 173 days.

(21) Appl. No.: 13/666,794

(22) Filed: Nov. 1, 2012

(65) Prior Publication Data

US 2014/0122885 A1 May 1, 2014

(51) Int. Cl.
*H04L 29/06* (2006.01)
*H04L 9/08* (2006.01)

(52) U.S. Cl.
CPC .............. *H04L 29/06* (2013.01); *H04L 9/0822* (2013.01)

(58) Field of Classification Search
None
See application file for complete search history.

(56) References Cited

U.S. PATENT DOCUMENTS

| | | | | |
|---|---|---|---|---|
| 7,103,911 B2* | 9/2006 | Spies et al. | | 726/3 |
| 7,366,702 B2* | 4/2008 | David | | 705/67 |
| 7,421,735 B2* | 9/2008 | Kerstens et al. | | 726/12 |
| 7,711,647 B2* | 5/2010 | Gunaseelan et al. | | 705/59 |
| 8,001,615 B2* | 8/2011 | Ksontini et al. | | 726/29 |
| 8,239,684 B2* | 8/2012 | Shima et al. | | 713/185 |
| 8,261,365 B2* | 9/2012 | Ksontini et al. | | 726/29 |
| 8,316,237 B1* | 11/2012 | Felsher et al. | | 713/171 |
| 8,347,079 B2* | 1/2013 | Cho et al. | | 713/156 |
| 8,861,737 B2* | 10/2014 | Thomas et al. | | 380/284 |
| 2006/0083369 A1* | 4/2006 | Lee | | 380/28 |
| 2007/0094373 A1* | 4/2007 | Brendel | | 709/223 |
| 2009/0158042 A1* | 6/2009 | Calhoun et al. | | 713/171 |

(Continued)

FOREIGN PATENT DOCUMENTS

TW 201225698 A1 6/2012

OTHER PUBLICATIONS

Reed, Benjamin C.; Smith, Mark A.; Diklic, Dejan. Security Considerations When Designing a Distributed File System Using Object Storage Devices. Proceedings, First International IEEE Security in Storage Workshop. Pub. Date: 2002. Relevant pp. 24-34. http://ieeexplore.iee.org/stamp.jsp=&arnumber=1183507.*

(Continued)

*Primary Examiner* — Dede Zecher
*Assistant Examiner* — Jeremiah Avery
(74) *Attorney, Agent, or Firm* — Novak Druce Connolly Bove + Quigg LLP

(57) ABSTRACT

The present disclosure provides a method and a system for managing the identification of devices (DID). A network device may provide the network device information to a server through a network. The server may generate a DID corresponding to the network device, and record the DID and the network device information into a device database. In addition, the network device and the server may share a shared key, which may be used to encrypt the DID and the network device information before the data transmission for enhancing security of the method. Moreover, the server may generate and record an exclusive key (Device Key) for data encryption before the data transmission with the network device, and transmit the Device Key to the network device. Therefore, the Device Key management may be accomplished simultaneously with the DID management to enhance data transmission security between the network device and the server.

19 Claims, 10 Drawing Sheets

(56) References Cited

U.S. PATENT DOCUMENTS

| | | | |
|---|---|---|---|
| 2009/0249448 A1* | 10/2009 | Choi et al. | 726/4 |
| 2010/0017593 A1* | 1/2010 | Putz | 713/150 |
| 2012/0137137 A1* | 5/2012 | Brickell et al. | 713/182 |

OTHER PUBLICATIONS

Kim, Jinhyung; Hwang, Jun; Kim, Taemin; Lee, Byungwook. Device Certification System and Method for User's convenient contents use. Future Generation Communication and Networking (FGCN 2007) vol. 2. Pub. Date: 2007. Relevant pp. 553-558. http://ieeexplore.ieee.org/xpls/icp.jsp?arnumber=4426303.*

Price, Alan; Kosaka, Kristie. A Key Pre-Distribution Scheme for Wireless Sensor Networks. Wireless Telecommunications Symposium, 2005. Relevant pp. 253-260. http://ieeexplore.ieee.org/stamp/stamp.jsp?tp=&arnumber=1524795.*

Zhao, Fangming; Hanatani, Yoshikazu; Komano, Yuichi; Smyth, Ben; Ito, Satoshi; Kambayashi, Toru. Secure Authenticated Key Exchange with Revocation for Smart Grid. 2012 IEEE PES Innovative Smart Grid Technologies (ISGT). Relevant pp. 1-8. http://ieeexplore.ieee.org/stamp/stamp.jsp?tp=&arnumber=6175530.*

* cited by examiner

METHOD AND SYSTEM FOR MANAGING DEVICE IDENTIFICATION

FIELD OF THE INVENTION

The present invention relates generally to a device identification (ID) management method and system applied to the management of network device IDs. The device ID management method and system may be further applied to the management of device key used for data encrypting at the network device.

BACKGROUND OF THE INVENTION

Generally, for management purposes, electronic devices sold on the market, such as computers, home appliances and consumer electronic products, are designated a unique device identification (device ID) before they leave the factory. The device ID will be stored in the firmware of the device. In addition, the device ID and other information of each device leaving the factory will be recorded in the device database to record, query and track such device. The device ID and other information stored in the device database may be used to determine whether the device is lawfully acquired. Services such as maintenance, warranty and/or update may be provided to the devices lawfully purchased. Moreover, such service may be provided through the Internet if a server verifies, through the device ID stored in the device database, that the device is lawfully acquired.

FIG. 1A illustrates an exemplary prior art reference of a device ID management system. The first network device 100 comprises a first storage module 110, and the second network device 200 comprises a second storage module 210. The first storage module 110 stores a first device ID 111 and a first device information 112, and the second storage module 210 stores a second device ID 211 and a second device information 212. The first network device 100 and the second network device 200 may communicate with a server 300 through the Internet, and the server 300 may access the device database 400. In addition, as illustrated by the device database log data 410, the first device ID 111, the first device information 112, the second device ID 211 and the second device information 212 are stored in the device database 400 before the first network device 100 and the second network device 200 leave the factory. In the prior art reference, the first network device 100 and the second network device 200 may transmit the first device ID 111 and the second device ID 211 to the server 300 respectively. In addition, the first network device 100 and the second network device 200 may request the server 300 to provide service, such as maintenance or update, through the Internet. The server may look up the first network device 100 and the second network device 200 in the device database 400 according to the first device ID 111 and the second device ID 211, and determine whether the first network device 100 and the second network device 200 have authorization based on the device database log data 410. If the first network device 100 and/or the second network device 200 possess authorization, the sever 300 may provide services to the first network device 100 and/or the second network device 200 through the Internet. Alternatively, the first network device 100 and the second network device 200 may transmit the first device ID 111, the first device information 112 and the second device ID 211, the second device information 212 to the server 300 respectively, and request the server 300 to update the device information. Accordingly, the server 300 may look up the first network device 100 and the second network device 200 in the device database 400 based on the first device ID 111 and the second device ID 211. Moreover, the server 300 may update the device database log data 410 according to the first device information 112 and the second device information 212 received.

However, device ID management system disclosed in the prior art reference may require the aforementioned device ID and the device information be stored in the device database before the network device leaves the factory. As a result, the log data in the device database may not be updated dynamically and device management becomes complicated and inflexible. For example, when the network device leaves the factory but remains unsold or unactivated, device management may not be necessary, and thus building a device database to maintain the device information may not be necessary. In addition, when a network device is reset by a user, the corresponding device ID of such network device may need to be retrieved from the device database and the corresponding device information may need to be updated. Therefore, there is a need in the art for a device ID management method and system to more conveniently and securely manage the device ID of the network devices. Such management method and system may also be implemented when a network device is reset.

BRIEF SUMMARY OF THE INVENTION

In one embodiment, a method for managing network device ID so as to provide more management flexibility is disclosed. The network device may include a desktop computer, a laptop computer, a tablet computer, a smart phone, a personal digital assistant (PDA), a network-attached storage (NAS), a router, a gateway or any device with internet connectivity. The management method may provide transmitting the device information of the network device to the server through the Internet. The device information may include hardware information such as model number and brand name, and software/firmware information such as software/firmware version, and network information such as network address. The server may generate an unique device ID according to the device information and transmit the device information and the device ID to the device database. The server may further transmit the device ID to the network device to be stored or registered. As a result, a device ID may be automatically designated to a network device after such network device leaves the factory and is activated. In addition, the corresponding device information may be transmitted and registered in the device database. Thereafter, when the network device is reset, a new device ID may be generated by the server and the corresponding device information may be registered in the device database, according to the device ID management method of the present disclosure. Accordingly, the network device being reset may not need to be retrieved in the device database, and corresponding device information may not need to be deleted before a new device information is generated.

In another embodiment, a shared device key may be pre-stored in the network device and the server. The shared device key may enhance the security of the device ID management method of the present disclosure. For example, the device information may be encrypted based on the shared device key before the network device transmits the device information. The server may decrypt the device information based on the shared device key after the server receives the device information. Similarly, the device ID may be encrypted based on the shared device key before the server transmits the device ID. The network device may decrypt the device ID based on the shared device key after the network device receives the device ID. In addition, the server may generate an unique device key for a network device, store the device key in the device database, and transmit the device key to the network device along with the device ID. The network device and the server may encrypt and decrypt the data transmitted between the network device and the server based on the device key after the device ID is designated and the device information is registered. Therefore, the device keys may be managed simultaneously with the management of the device ID to enhance the security of data transmission between a network device and a server.

In yet another embodiment, a second network device may encrypt the device information based on the shared device key and transmit the device information to the first network device. An exemplary second network device may be a terminal device such as a desktop computer, a laptop computer, a tablet computer, a smart phone, a personal digital assistant (PDA) or a network-attached storage (NAS). An exemplary first network device may be an internet device such as a router or a gateway. Consequently, after decrypting the device information based on the shared device key, the first network device may encrypt the device information based on the first device key and transmit the device information to the server. After decrypting the device information based on the first device key, the server may generate an unique second device ID and an unique second device key of the second network device according to the second device information. The server may encrypt based on the first device key and transmit the second device ID, the second device key and the first device key to the first network device. After decrypting the second device ID and the second device key based on the first device key, the first network device may encrypt the second device ID and the second device key based on the shared device key and transmit the second device ID and the second device key to the second network device. Thereafter, the second may acquire and decrypt the second device ID and the second device key based on the shared device key. Therefore, through encrypting the data transmission between the second network device and the server by the first network device, which has already acquired the first device ID and the first device key, the security of the data transmission between the server and the network device in the device ID management method may be enhanced.

It should be understood, however, that this Summary may not contain all aspects and embodiments of the present invention, that this Summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

In accordance with common practice, the various described features are not drawn to scale and are drawn to emphasize features relevant to the present disclosure. Like reference characters denote like elements throughout the figures and text.

DETAILED DESCRIPTION OF THE INVENTION

Figure 1A:
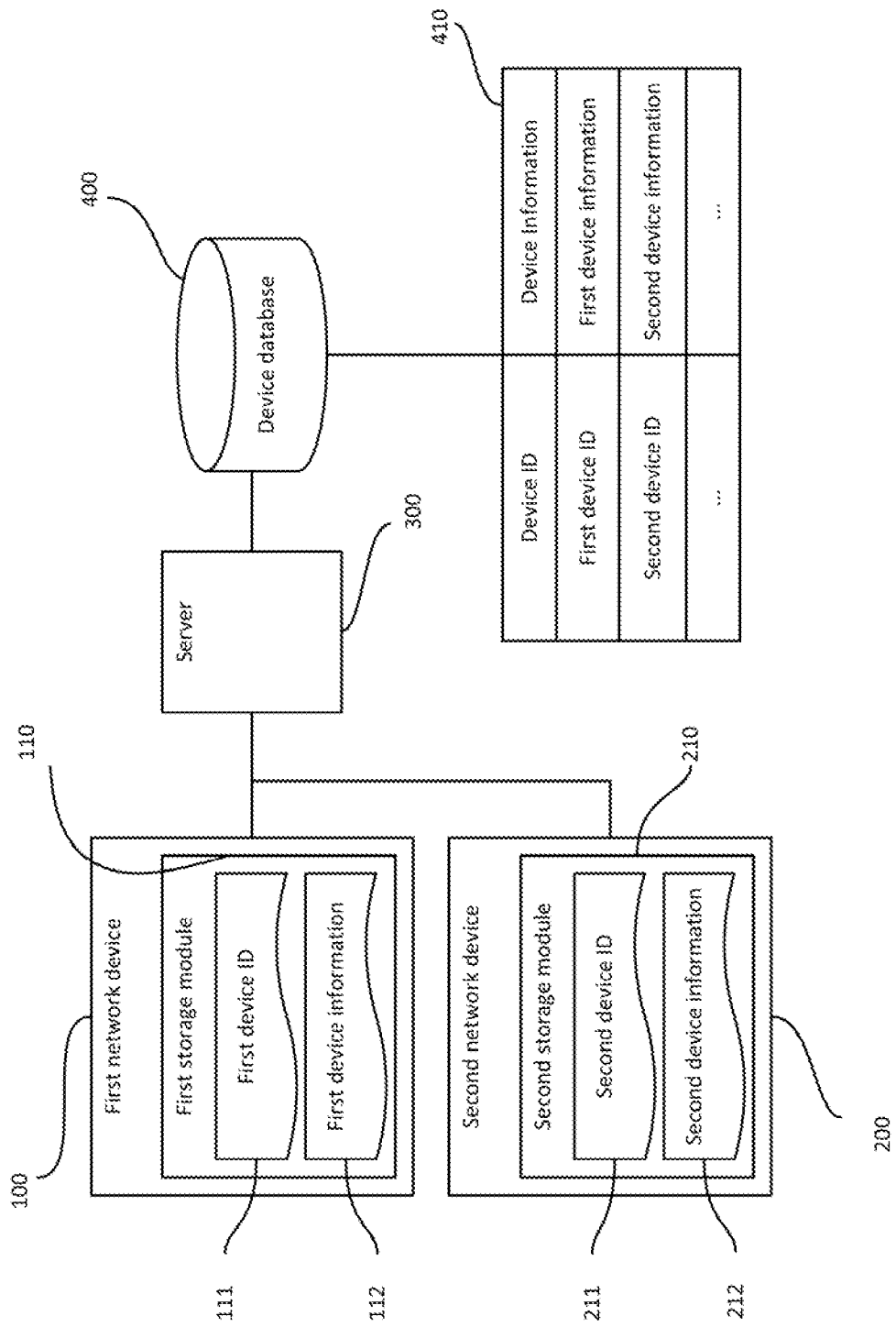
FIG. 1A is a schematic illustration of a prior art reference of a system for managing device ID disclosed in the prior art reference.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present invention in conjunction with the accompanying drawings in FIGS. 1A-3H. Reference will be made to the drawing figures to describe the present invention in detail, wherein depicted elements are not necessarily shown to scale and wherein like or similar elements are designated by same or similar reference numeral through the several views and same or similar terminology. In accordance with the purposes of this invention, as embodied and broadly described herein, this invention, FIG. 1A is a schematic illustration of a system for managing device ID disclosed in the prior art reference, as described in the background section, and thus will not be repeated herein. FIGS. 1B-1G are block diagrams of the system for managing device ID according to some embodiments of the present invention.

Figure 1B:
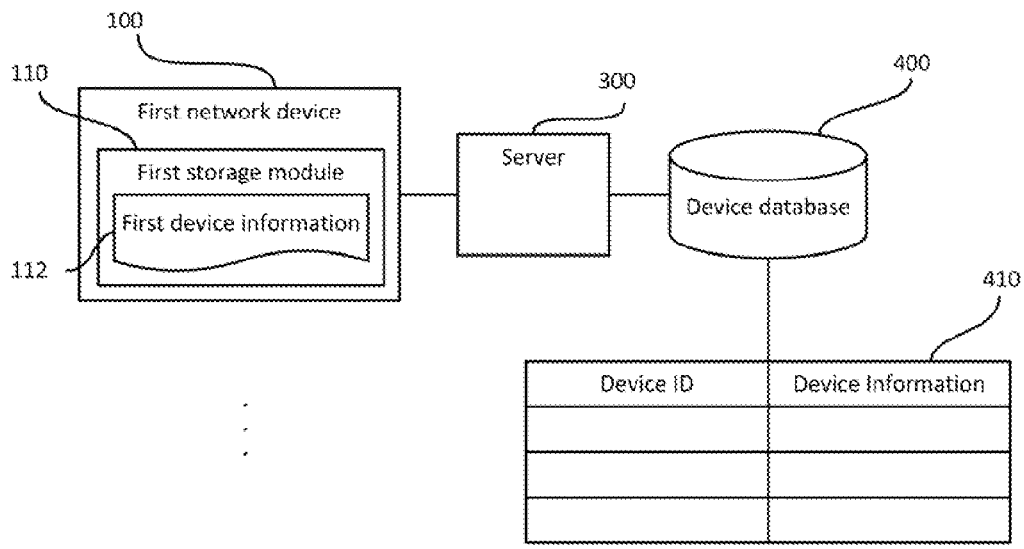
FIGS. 1B-1G are block diagrams of the system for managing device ID according to some embodiments of the present invention.
Figure 1C:
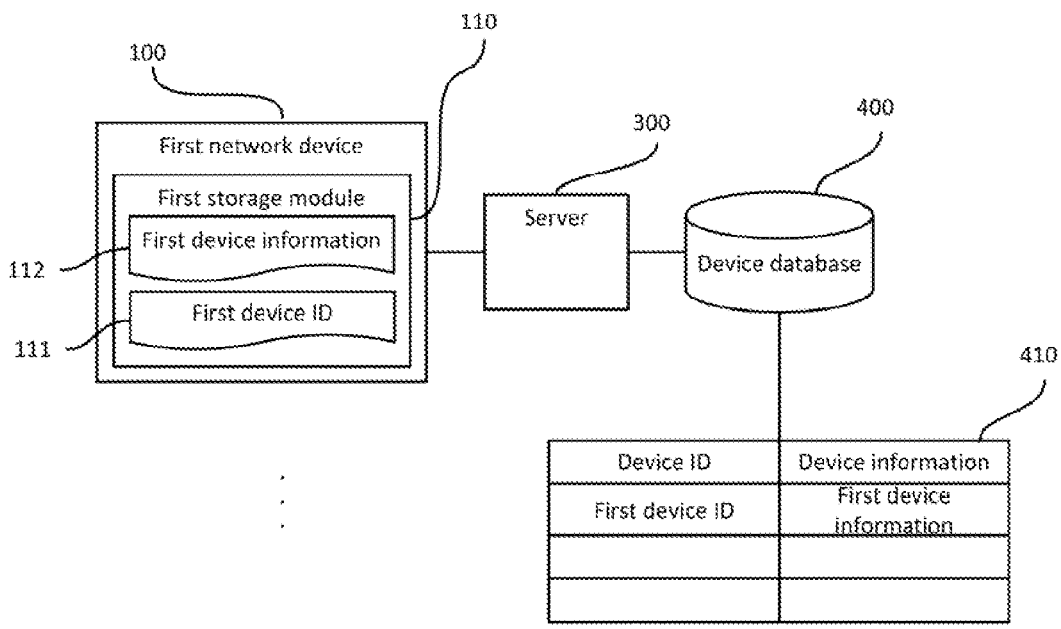

FIGS. 1B and 1C in combination illustrate one embodiment of a system implementing the device ID management method of the present invention. Specifically, FIG. 1B is an illustration of the system for managing device ID having a first network device 100, a server 300 and a device database 400 communicative with one another. The server 300 may access the device database 400, and the device database 400 may store the device IDs and the device information. The first network device 100 may be a computing device with internet connectivity such as a desktop computer, a laptop computer or a tablet computer, or a handheld device such as a smart phone or a personal digital assistant (PDA). In addition, the first network device 100 may be a network device such as a modem, a gateway, a router, a access point, a hot spot or a femtocell, or a network equipment such as a network-attached storage (NAS), a firewall, a workstation or a proxy server. The first network device may further be any device having an input, an output and internet connectivity, such as an IP cam, a web cam, a wifi speaker, a TV, a setup box or a wireless sensor. The first storage module 110 may be an internal or external storage device of the first network device 100. For example, the first storage module 110 may be a thumb drive, a hard disk, a solid state drive, a ROM, a RAM, an EPROM, an EEPROM, or any computer-readable storage medium. The server 300 may be a server cluster or data center constructed by several servers. The device database 400 may be part of the server 300, or be running on another computing device that may be accessed by the server 300. The device database log data may be a table of a relational database. The column of the table may include device ID and device information such as hardware, software or network information. The row of the table may include information of only one network device. The device ID may also serve as a key value of the table. It is to be noted that person having ordinary skill in the art will understand that the device database 400 of the present invention may not be a relational database, and databases of network model, object model and hierarchy model may also be used.

In detail, FIG. 1B illustrates an exemplary embodiment of the device ID management system before the device ID is generated. The first network device 100 may comprise a storage module 110 to store a first device information 112 and may transmit the first device information 112 to the server 300. The device database 400 may store the device database log data 410, which may include the device ID column and the device information column, as illustrated. The first device information 112 may include hardware related information such as a brand name, a model number a firmware version, or software related information such as an application version or an application interface version. Moreover, the first device information 112 may include network information such as an IP address or a web service port number.

FIG. 1C illustrates an exemplary embodiment of the device ID management system after the device ID is generated. Here, after the first network device 100 transmits the first device information 112 to the server 300 through the internet, the server 300 may generate a first device ID 111 of the first network device 100 according to the first device information 112, and may transmit the first device ID 111 to the first network device 100. The first network device 100 may store the first device ID 111 in the first storage module 11. In addition, the server 300 may store the first device ID 111 and the first device information 112 to the device database 400. As illustrated, the server 300 may further update the device database log data 410, i.e., add the first device ID 111 and the first device information 112 to the device database log data 410. As a result, device ID may be more easily managed as the device ID may not need to be pre-designated to a network device before it leaves the factory, and the device ID may be stored and updated in a server.

Figure 1D:
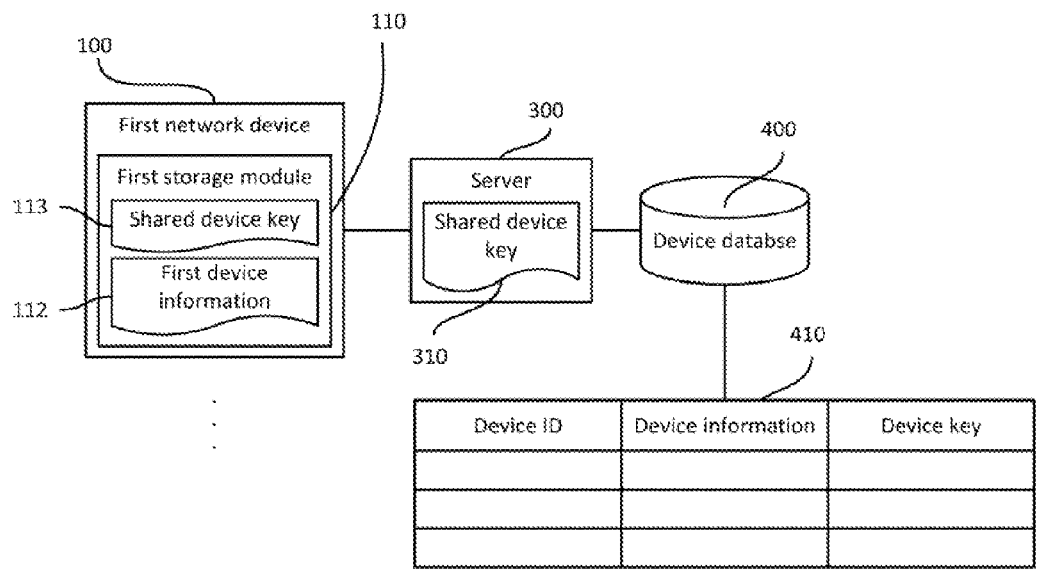
Figure 1E:
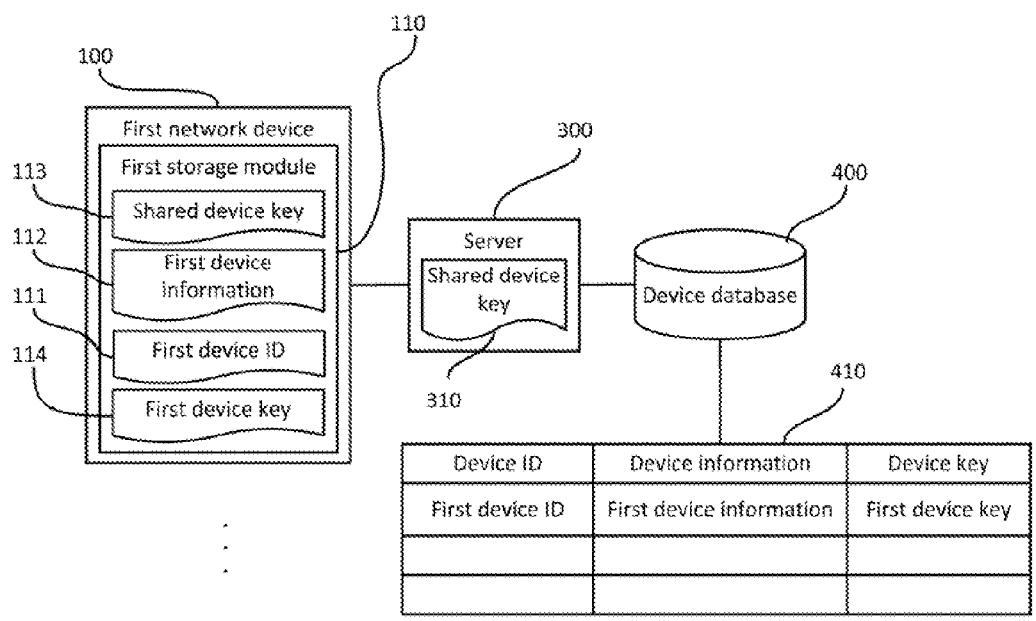

FIGS. 1D and 1E in combination illustrate one embodiment of a system implementing the device ID management method of the present invention. Specifically, FIG. 1D illustrates an exemplary device ID management system before the device ID is generated. Here, in addition to the first device information 112, the first storage module 110 may be pre-stored with a shared device key 113. The first network device 100 may encrypt the first device information 112 based on the shared device key 113 before transmitting the first device information 112 to the server 300. The server 300 may be pre-stored with a shared device key 310, which may be used to encrypt the data encrypted based on the shared device key 113. In addition, the shared device key 310 may be used to encrypt data, which may be decrypted based on the shared device key 113. As illustrated, the device database log data may further include columns for device keys.

FIG. 1E illustrates an exemplary embodiment of the device ID management system after the device ID is generated. Here, the first network device 100 may encrypt the first device information 112 based on the shared device key 113 and may transmit the first device information 112 to the server 300. The server 300 may decrypt the received first device information 112 based on the shared device key 310, and may generate an first device ID 111 and a first device key 114 unique to the first network device 100 according to the first device information 112. The server 300 may further encrypt the first device ID 111 and the first device key 114 based on the shared device key 310 and transmit encrypted first device ID 111 and first device key 114 to the first network device 100. The first network device 100 may decrypt the first device ID 111 and the first device key 114 based on the shared device key 113 and store the decrypted first device ID 111 and the first device key 114 to the first storage module 110. In addition, the server 300 may store the first device ID 111, the first device information 112 and the first device key 114 to the device database 400, and may update the device database log data 410, i.e., add the first device ID 111, the first device information 112 and the first device key 114 to the device database log data 410. As a result, the device keys may be managed simultaneously with the management of the device ID to enhance the security of data transmission between a network device and a server.

The shared device key 113 and the shared device key 310 may be keys of a symmetric encrypting system. That is, the shared device key 113 may be the same as the shared device key 310, and possessed by the first network device 100 and the server 300 respectively for encrypting and decrypting data. Alternatively, the shared device key 113 and the shared device key 310 may be keys of an asymmetric encrypting system. In this embodiment, the shared device key 113 may include a first private key and a first public key, and the shared device key 300 include a second private key and a second public key. The first private key and the second private key are used for decryption. The first public key may be used for encryption, and such encryption may be decrypted by the server 300 using the second private key. Similarly, the second public key may be used for encryption, and such encryption may be decrypted by the first network device 100 using the first private key. In another embodiment, all the network devices are pre-stored with the shared device key 113 when they leave the factory. Therefore, the process of acquiring the device ID in the device ID management system may be encrypted based on the shared device key 113. Moreover, the data encrypted by and transmitted from the server 300 may be decrypted based on the shared device key 113.

It is to be noted that although the first device key 114 may be generated by the server 300, person having ordinary skill in the art will understand that the first device key 114 may be a key of a symmetrical encrypting system or a key of an asymmetrical encrypting system. In yet another embodiment of the present invention, after the first network device 100 may encrypt data based on the first device key 114 and transmit such data to the server 300 after the first network device 100 acquires the first device key 114. The server 300 then acquires the first device key 114 from the device database 400, and decrypt the data received from the first network device 100 based on the first device key 114.

Figure 1F:
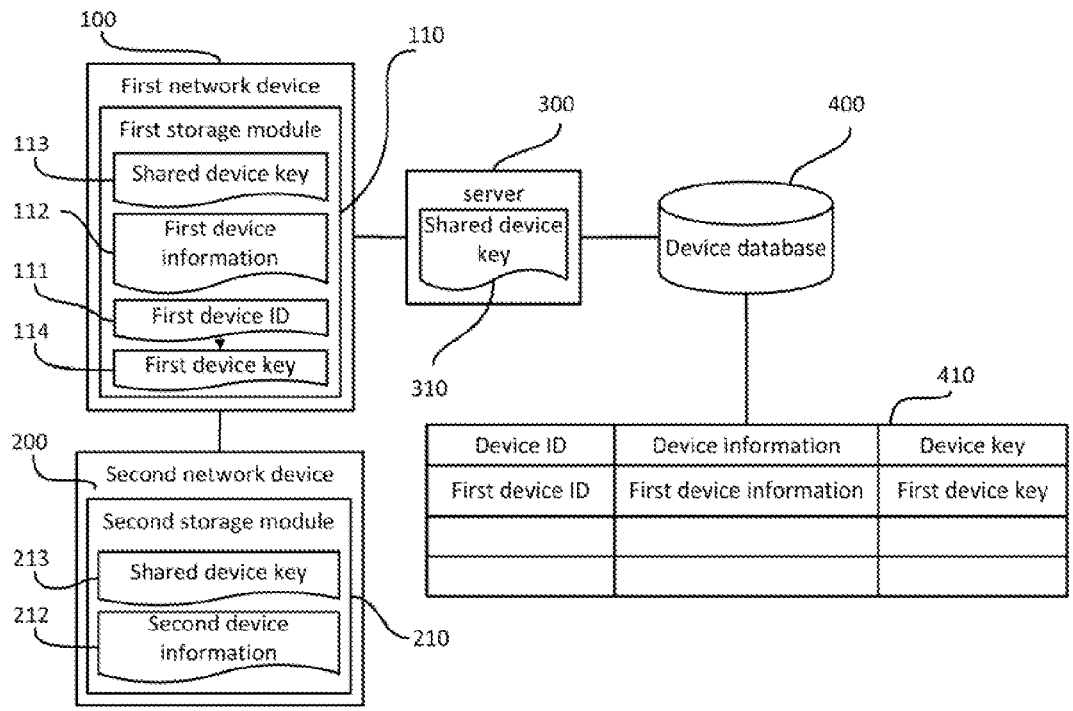
Figure 1G:
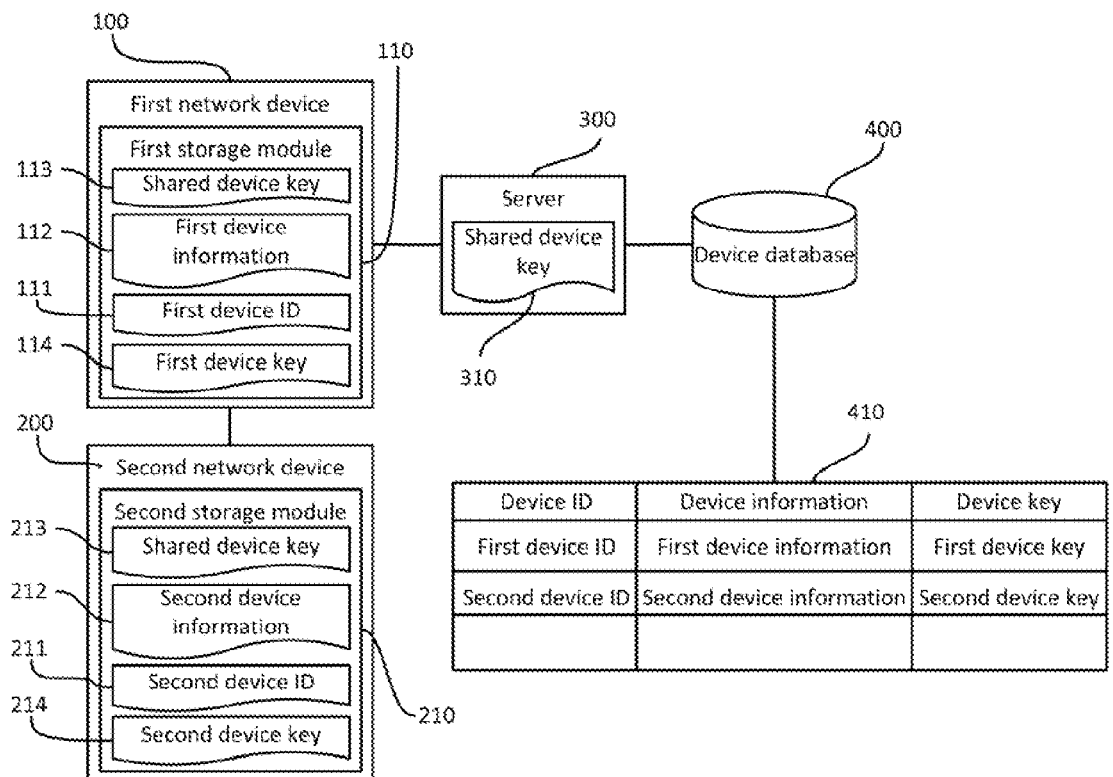

FIGS. 1F and 1G in combination illustrate one embodiment of a system implementing the device ID management method of the present invention. Specifically, FIG. 1F illustrates an exemplary device ID management system before the device ID is generated. The relationships between the first network device 100, the server 300 and the device database 400 are identical to those illustrated in FIG. 1E, and therefore will not be repeated. Here, a second network device 200 is provided and the second network device 200 is communicative with the first network device 100. In this embodiment, the first storage module 110 stores a first device ID 111, a first device information 112, a shared device key 113 and a first device key 114, and the first network device 100 may receive data from the second network device 200. The second network device 200 may include a second storage module 210 for storing the second device information 212 and the shared device key 213. The shared device key 213 may be used to decrypt the data encrypted by the shared device key 113. Furthermore, the shared device key 213 may be used to encrypt data, which may be decrypted based on the shared device key 113. As illustrated, the device database log data 410 may include columns for device ID, device information and device key. In addition, the device database log data may include the first device ID 111, the first device information 112 and the first device key 114 of the first network device 100.

FIG. 1G illustrates an exemplary embodiment of the device ID management system after the device ID is generated. The relationships between the first network device 100, the second network device 200, the server 300 and the device database 400 are identical to those illustrated in FIG. 1F, and therefore will not be repeated. Here, the second network device 200 may use the shared device key 213 to encrypt the second device information 212 and transmit the encrypted second device information 212 to the first network device 100. The first network device 100 may decrypt the second device information 212 based on the shared device key 113, encrypt such based on the first device key 114 and transmit such to the server 300. The server 300 may acquire the first device key 114 from the device database 400 and decrypt the encrypted second device information 212. The server 300 may further generate a second device ID 211 and a second device key 214 unique to the second network device according to the second device information 212. The server 300 may then encrypt the second device ID 211 and the second device key 214 based on the first device key 114 and transmit such the encrypted second device ID 211 and the second device key 214 to the first network device 100. The first network device may decrypt the second device ID 211 and the second device key 214 encrypted by the server 300 based on the first device key 114, encrypt the second device ID 211 and the second device key 214 based on the shared device key 113, and transmit the encrypted second device ID 211 and the second device key 214 to the second network device 200. The second network device 200 may decrypt the encrypted second device ID 211 and second device key 214 based on the shared device key 213, and store the decrypted second device ID 211 and second device key 214 to the second storage module 210. In addition, the first network device 100 may transmit the first device ID 111 and the encrypted second device information 212 to the server 300 so as to enable the server 300 to query and retrieve the first device key 114 in the device database 400 according to the first device ID 111. Moreover, the server 300 may store the second device ID 211, the first device information 212 and the first device key 214 to the device database 400, and update the device database log data 410 as illustrated in FIG. 1G. It is to be noted that the shared device key 213 and the second device key 214 may be keys of a symmetric encrypting system or an asymmetric encrypting system, as illustrated in the embodiments in FIGS. 1D and 1E. As a result, through encrypting the data transmission between the second network device 200 and the server 300 by the first network device 100, which has already acquired the first device ID 111 and the first device key 114, the security of the data transmission between the server 300 and the network devices in the device ID management method may be enhanced.

In another embodiment, the first network device 100 and the second network device 200 may possess the shared device key 113 and the shared device key 213 respectively. Accordingly, the first network device 100 may encrypt the device ID based on the shared device key 113, and the second network device 200 may encrypt the device ID based on the shared device key 213. Moreover, the first network device 100 and the second network device 200 may decrypt the data received from and encrypted based on the shared device key 310 by the server 300. In yet another embodiment, all the network devices, including the first network device 100 and the second network device 200, may possess a same shared device key. That is, shared device key 113 and shared device key 213 may be identical. In addition, after the second network device 200 acquires the second device key 214, the second network device 200 may encrypt the data based on the second device key 214 before transmitting such data to the server 300. Thereafter, the server 300 may acquire the second device key 214 from the device database 400, and decrypt the data received from the second network device 200 based on the second device key 214.

Figure 2A:
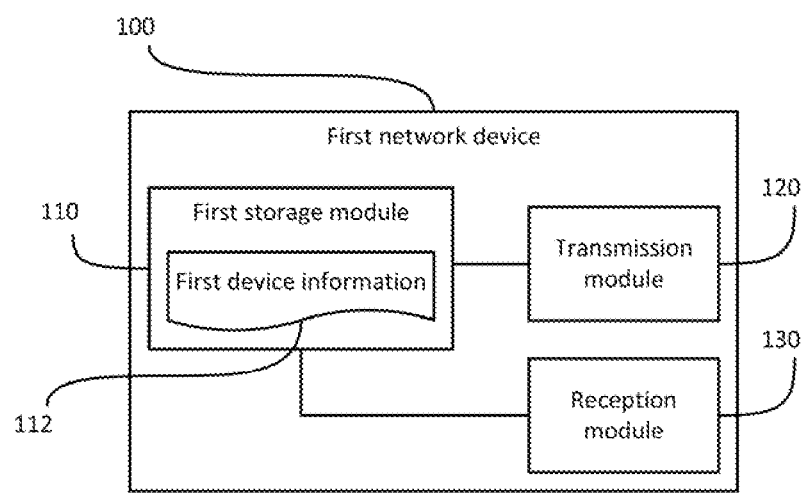
FIGS. 2A and 2B are block diagrams of a network device for managing device ID according to some embodiments of the present invention.
Figure 2B:
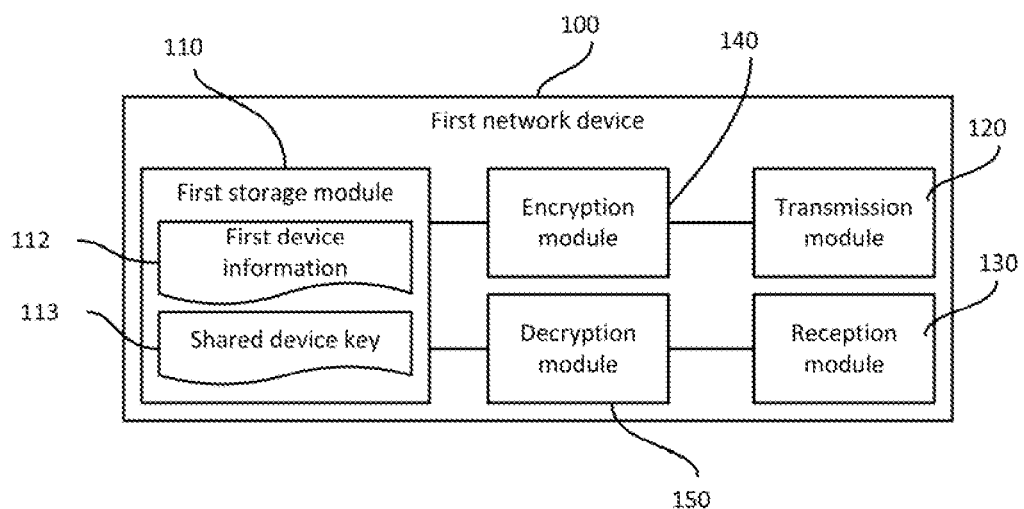

FIGS. 2A and 2B are block diagrams of a network device for managing device ID according to some embodiments of the present invention. Specifically, the network device may be implemented in the aforementioned device ID management system.

FIG. 2A illustrates an exemplary embodiment of the network device for managing device ID. The first network device 100 may comprise a first storage module 110, which may store a first device information 112, as illustrated in FIG. 1B. In addition, the first network device 100 may comprise a transmission module 120 and a reception module 130. The first network device 100 may transmit the first device information 112 to the server 300 via the transmission module 120, and may receive a first device ID 111 from the server 300 via the reception module 130, as illustrated in the embodiments in FIGS. 1B and 1C. The first device ID 111 may be generated by the server 300 according to the first device information 112. In addition, the first storage module 110 may store the first device ID 111, as illustrated in the embodiment in FIG. 1C.

FIG. 2B illustrates another exemplary embodiment of the network device for managing device ID. The first network device 100 may comprise a first storage module 110, which may store a first device information 112 and a shared device key 113, as illustrated in FIG. 1D. In addition, the first network device 100 may comprise a transmission module 120, a reception module 130, an encryption module 140 and a decryption module 150. The first network device 100 may encrypt the first device information 112 by the encryption module 140 based on the shared device key 113, and may transmit the encrypted first device information 112 to the server via the transmission module 120, as illustrated in the embodiment in FIG. 1D. Moreover, the first network device 100 may receive via the reception module 130 the first device ID 111 from the server 300, as illustrated in the embodiment in FIG. 1E. Furthermore, the first network device 100 may decrypt the device ID 111 based on the shared device key 113 by the decryption module 150, and then transmit the result to the first storage module 110. The first device ID 111 may be generated by the server 300 according to the first device information 112, and transmitted to the first network device 100 after the server 300 encrypts it based on the shared device key 310.

In another embodiment, with reference to FIG. 1E, the reception module 130 may receive the first device key 114, which is encrypted by the server based on the shared device key 310. It is to be noted that the first device key 114 may be generated by the server 300. Moreover, the decryption module 150 may decrypt the first device key 114 based on the shared device key 113. The decrypted first device key 114 may be later transmitted to the first storage module 110.

In another embodiment, with reference to FIG. 1F, the reception module 130 may receive from the second network device 200, the second device information 212, which is encrypted by the second network device 200 based on the shared device key 213. The decryption module 150 may decrypt the encrypted second device information 212 based on the shared device key 113. The encryption module 140 may encrypt the second device information 212 based on the first device key 114 received from the server 300. The transmission module 120 may transmit the encrypted second device information 212 to the server 300. With reference to FIG. 1G, the reception module 130 may receive from the server 300 the second device ID 211 and the second device key 214, which are encrypted based on the first device key 114 by the server 300. The decryption module 150 may decrypt the first device key 114. The encryption module 140 may encrypt the first device key 114 based on the shared device key 113. The transmission module 120 may transmit the encrypted second device ID 211 and the second device key 214 to the second network device 200.

It is to be noted that the transmission module 120 and the reception module 130 may respectively be a transmitter or a receiver of the first network device 100 for accessing the Internet. Alternatively, the transmission module 120 and the reception module 130 may be combined as a transceiver for transmitting and receiving wired or wireless signals. In addition, the encryption module 140 and the decryption module 150 may utilize any encrypting and decrypting algorithm to encrypt and decrypt the information through keys. The encryption module 140 and the decryption module 150 may be stored in computer readable mediums, such as ROM, RAM, EPROM, EEPROM, hard disk, solid state disk, or the like, in the form of a software or a firmware. In some embodiments of the present invention, the aforementioned computer readable medium may be the first storage module 110. Moreover, the encryption module 140 and the decryption module 150 may be implemented in the form of an electric circuit in semiconductors or circuit boards, such as application-specific integrated circuit (ASIC) or printed circuit board (PCB).

FIGS. 3A-3H are flowcharts illustrating the device ID management method according to some embodiments of the present invention. Specifically, the device ID management method provides a series of processes for the server to generate a device ID corresponding to a specific network device.

Figure 3A:
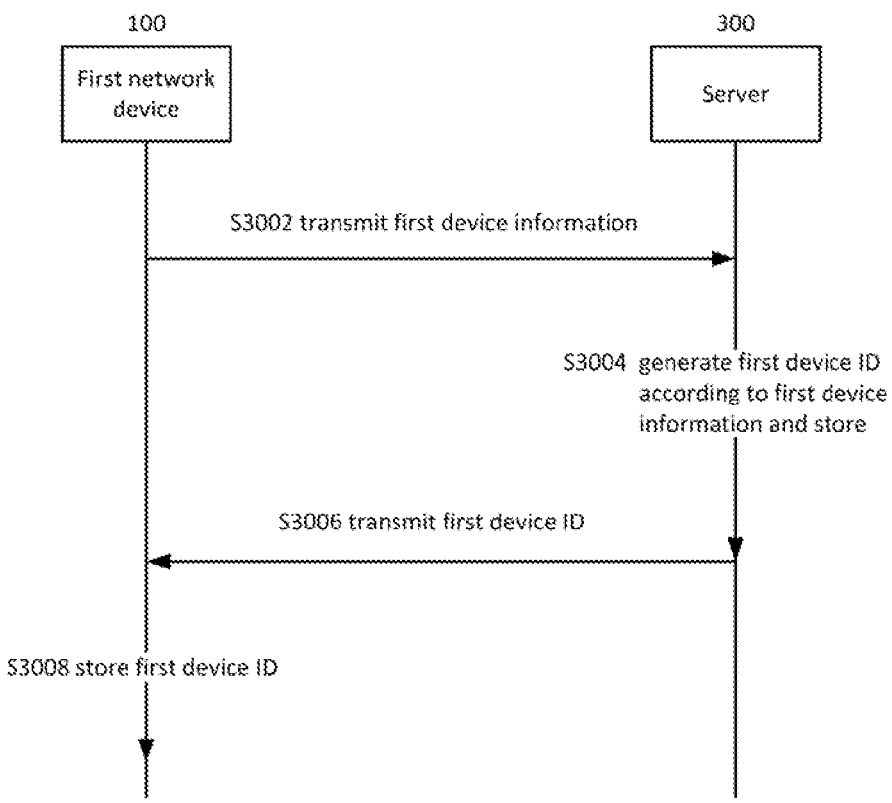
FIGS. 3A-3H are flowcharts illustrating the device ID management method according to some embodiments of the present invention.

FIG. 3A illustrates an exemplary embodiment of the device ID management method. Specifically, the present embodiment may be implemented in the system disclosed in FIGS. 1B and 1C. In step S3002, the first network device 100 may transmit a first device information 112 to the server 300. In step S3004, the server 300 may generate a first device ID 111 unique to the first network device 100 according to the first device information 112, and may further store the first device ID 111. In step S3006, the server 300 may transmit the first device ID 111 to the first network device 100. In step S3008, the first network device 100 may receive and store the first device ID 111. In addition, the server 300 may store the first device ID 111 and the first device information 112. As a result, device ID may be more easily managed as the device ID may not need to be pre-designated to a network device before it leaves the factory, and the device ID may be stored and updated in a server.

In another embodiment, when the first network device 100 is reset, the first device ID may be accordingly deleted, and the first network device 100 may acquire another device ID by implementing the method disclosed in FIG. 3A. Therefore, the first device ID 111 unique to the first network device 100 may only correspond to the first network device 100, but not other network devices. Similarly, the first device key 114 unique to the first network device 100, may only correspond to the first network device 100. Moreover, the second device ID 211 and the second device key 214 unique to the second network device 200 may only correspond to the second network device 200. Consequently, if the first network device 100 is reset and running normally, a new device ID may be directly acquired by implementing the device ID management method, instead of searching for the first network device 100 in the device database 400 to amend the first device information. As a result, the network device being reset may not need to be retrieved in the device database, and corresponding device information may not need to be deleted before a new device information is generated.

Figure 3B:
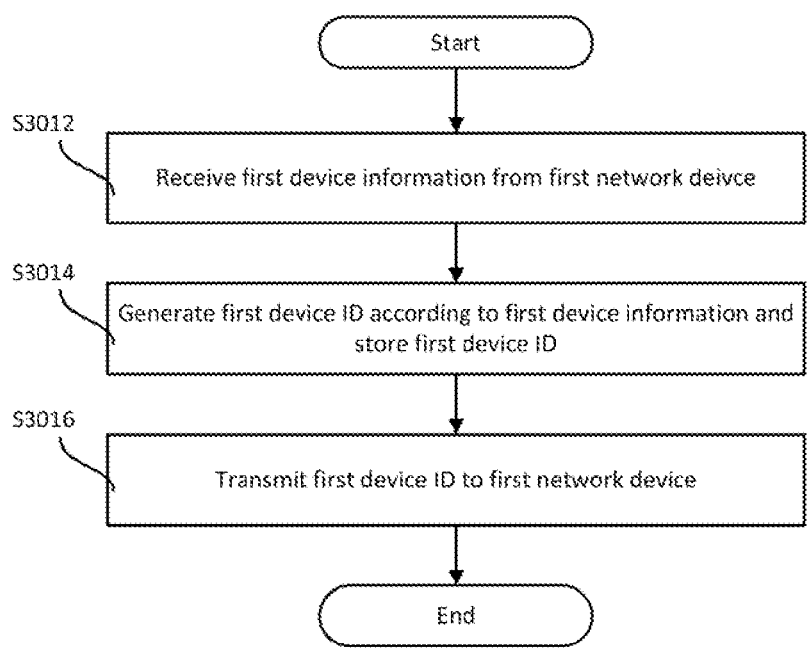

FIG. 3B is another exemplary embodiment of the device ID management method illustrating the steps executed by a server in FIG. 3A. In step S3012, the server 300 may receive the first device information 112 from the first network device 100. In step S3014, the server 300 may generate a first device ID 111 unique to the first network device 100, and may store the first device ID 111. In step S3016, the server transmits the first device ID 111 to the first network device 100. In addition, the server 300 may store the first device ID 111 and the first device information 112 in the device database 400, as disclosed in the embodiment in FIG. 1C.

Figure 3C:
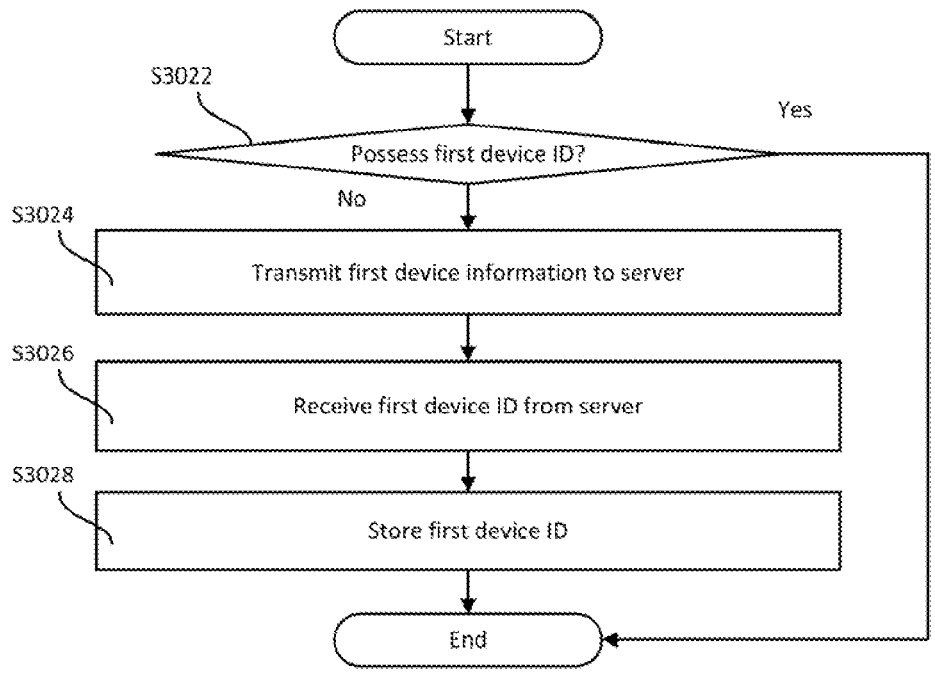

FIG. 3C is another exemplary embodiment of the device ID management method illustrating the steps executed by a network device in FIG. 3A. In step S3022, the first network device 100 verifies whether it possess the first device ID 111. If affirmative, the device ID management method may be terminated. If negative, the first network device 100 performs step S3024. In step S3024, the first network device 100 transmits the first device information 112 to the server 300. In step S3026, the first network device 100 receives and stores the first device ID 111 from the serve 300. The first device ID 111 was generated by the server 300 according to the first device information 112, and the first device ID 111 is unique to the first network device 100. In step S3028, the first network device 100 stores the first device ID 111. Afterwards, the device ID management method may be terminated.

Figure 3D:
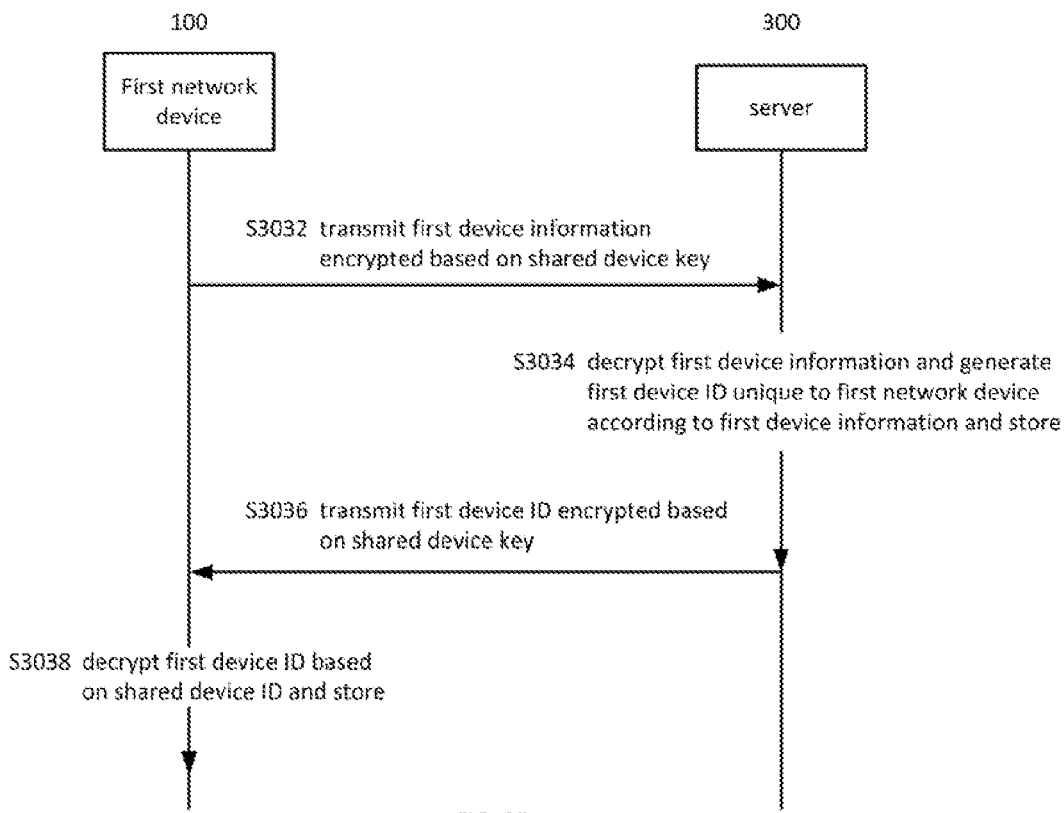

FIG. 3D illustrates an exemplary embodiment of the device ID management method. Specifically, the present embodiment may be implemented in the system disclosed in FIGS. 1D and 1E. In step S3032, the first network device 100 may encrypt the first device information 112 based on a shared device key, and may transmit the encrypted first device information 112 to the server 300. In step S3034, the server 300 may decrypt the received first device information 112 based on the shared device key, and generate a first device ID 111 unique to the first network device 100 according to the first device information 112. Moreover, the server 300 may store the first device ID 111. In step S3036, the server 300 may encrypt the first device ID 111 based on the shared device key, and transmit the encrypted first device ID 111 to the first network device 100. In step S3038, the first network device 100 may decrypt the received first device ID 111 based on the shared device key, and store the decrypted first device ID 111. As a result, the device keys may be managed simultaneously with the management of the device ID to enhance the security of data transmission between a network device and a server.

Figure 3E:
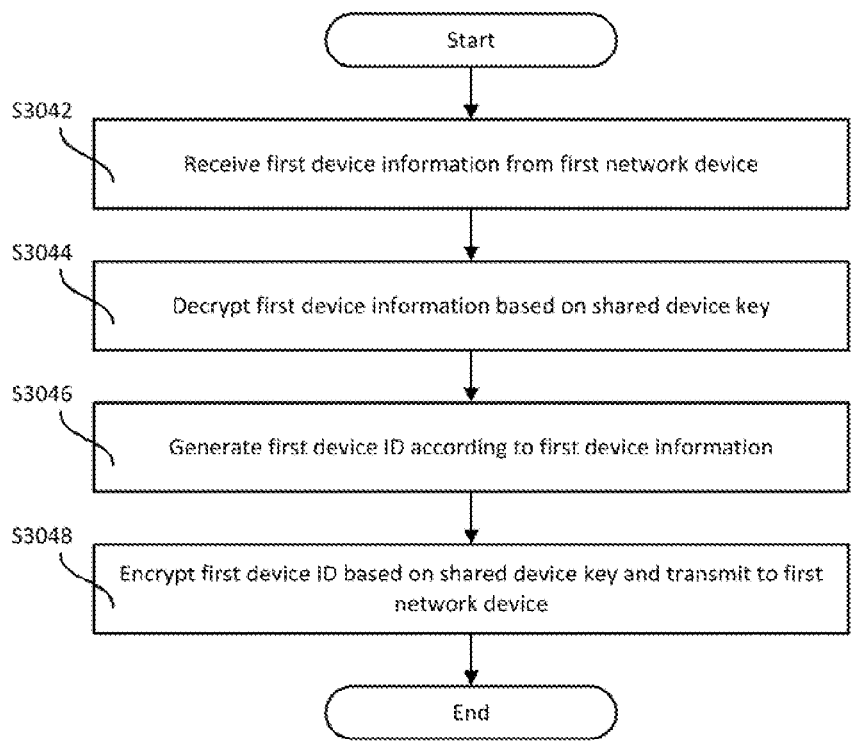

FIG. 3E is another exemplary embodiment of the device ID management method illustrating the steps executed by a server in FIG. 3D. In step S3042, the server 300 may receive from the first network device 100 the first device information 112 encrypted based on the shared device key. In step S3044, the server 400 may decrypt the first device information 112 based on the shared device key. In step S3046, the server 300 may generate a first device ID 111 unique to the first network device 100 according to the first device information 112. Moreover, the server 300 may store the first device ID 111. In step S3048, the server 300 may encrypt the first device ID 111 based on the shared device key, and may transmit the encrypted first device ID 111 to the first network device 100. In addition, the server 300 may store the first device ID 111 and the first device information 112 in the device database 410.

Figure 3F:
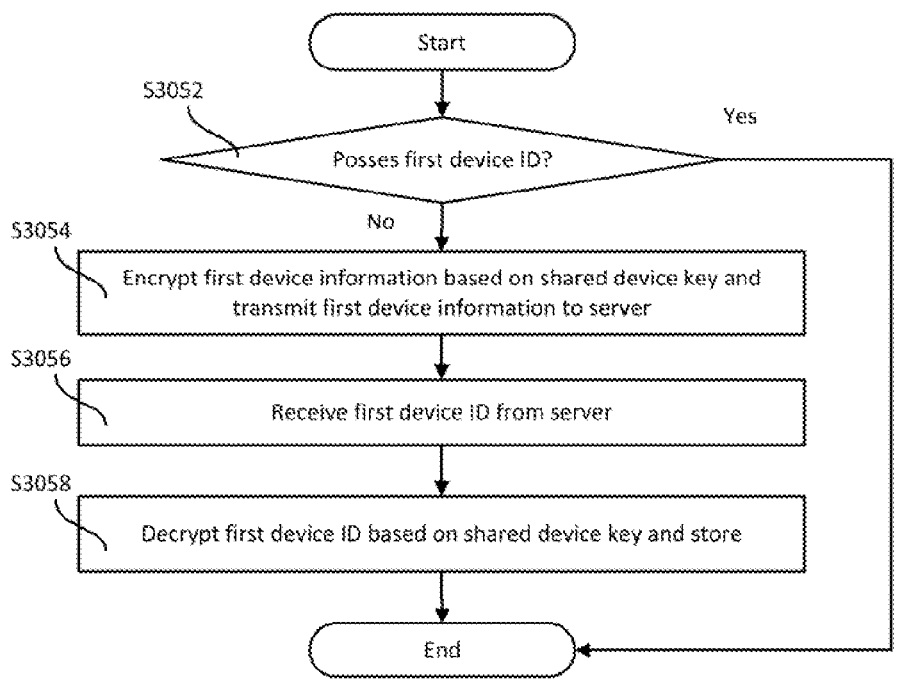

FIG. 3F is another exemplary embodiment of the device ID management method illustrating the steps executed by a network device in FIG. 3D. In step S3052, the first network device 100 verifies whether it possess the first device ID 111. If affirmative, the device ID management method may be terminated. If negative, the first network device 100 performs step S3054. In step S3054, the first network device 100 may encrypt the first device information 112 based on the shared device key and transmit the encrypted first device information 112 to the server 300. In step S3056, the first network device 100 receives from the server 300 the first device ID 111 encrypted based on the shared device key. The first device ID 111 was generated by the server 300 according to the first device information 112, and the first device ID 111 is unique to the first network device 100. In step S3058, the first network device 100 decrypts the first device ID 111 based on the shared device key and stores the decrypted first device ID 111. Afterwards, the device ID management method may be terminated.

Figure 3G:
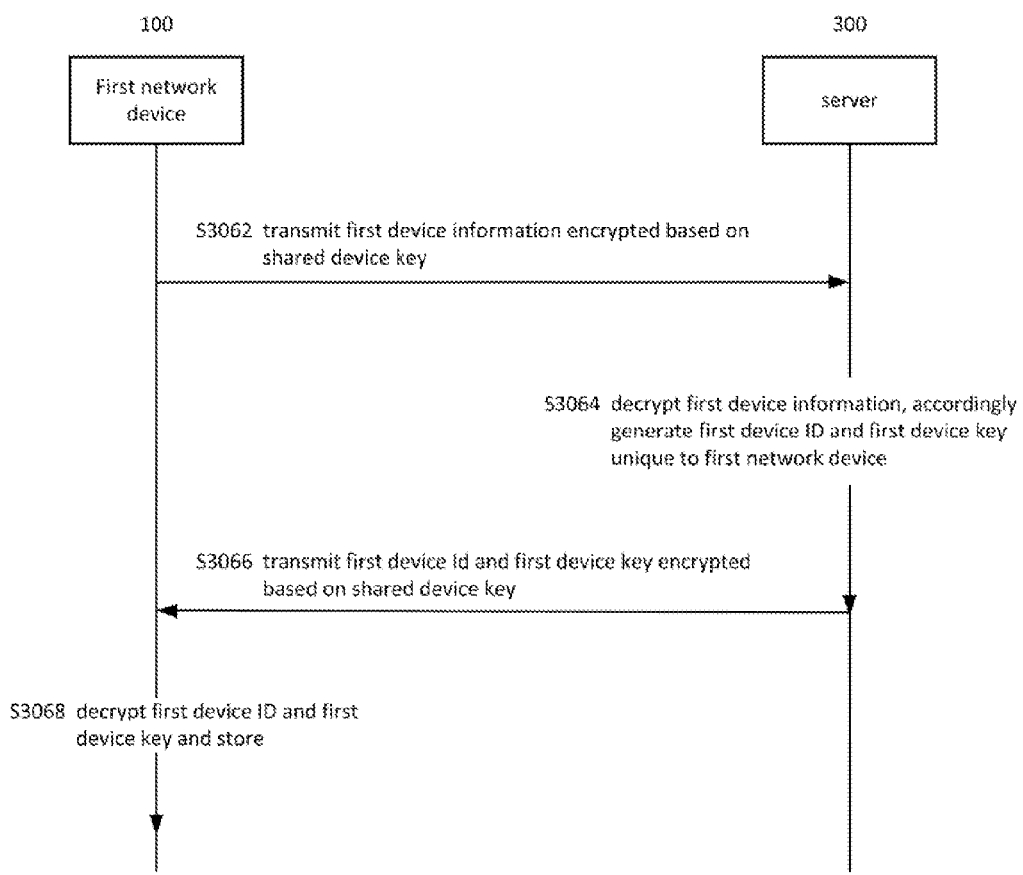

FIG. 3G illustrates another exemplary embodiment of the device ID management method. Specifically, the present embodiment may be implemented in the system disclosed in FIGS. 1D and 1E. In step S3062, the first network device 100 may encrypt the first device information 112 based on the shared device key, and may transmit the encrypted first device information 112 to the server 300. In step S3064, the server 300 may decrypt the first device information 112 based on the shared device key. In addition, the server 300 may generate according to the first device information 112 a first device ID 111 and a first device key 114 unique to the first network device 100. Moreover, the server 300 may store the first device ID 111 and the first device key 114. In step S3066, the server 300 may encrypt the first device ID 111 and the first device key 114 based on the shared device key, and may transmit the encrypted first device ID 111 and first device key 114 to the first network device 100. In step S3068, the first network device 100 may decrypt the first device ID 111 and the first device key 114 received from the server 300 based on the shared device key. In addition, the first network device 100 may store the decrypted first device ID 111 and first device key 114. As a result, the device keys may be managed simultaneously with the management of the device ID to enhance the security of data transmission between a network device and a server.

In one embodiment, the server 300 may store the first device ID 111, the first device information 112 and the first device key 114 in the device database 400, and may accordingly update the device database log data 410, i.e., add the first device ID 111, the first device information 112 and the first device key 114 to the device database log data 410. In another embodiment, the first network device 100 may encrypt a data request based on the first device key 114 after the first network device 100 acquires the first device key 114, and may transmit the encrypted data request to the server 300. The server may acquire the first device key 114 from the device database 400, and decrypt the data request transmitted from the first network device 100 based on the first device key 114 so as to respond to the data request.

In another embodiment, the present invention provides a device ID management method implemented in a server. Specifically, such device ID management method may be programmed into a computer program, which may be executed by a computing device or may be stored in a computer-readable medium and later read and executed by a computing device. The device ID management method of the server 300 may include receiving from the first network device 100 a first device information 112 encrypted based on shared device key; decrypting the first device information 112 based on the shared device key; generating a first device ID 111 unique to the first network device 100 according to the first device information 112, generating a first device key 114 unique to the first network device 100, and storing the first device ID 111 and the first device key 114; encrypting the first device ID 111 and the first device key 114 based on the shared device key, and transmitting to the first network device 100 the first device ID 111 and the first device key 114. In addition, the server 300 may store the first device ID 111, the firs device ID 111, the first device information 112 and the first device key 114 in the device database 400. In another embodiment, the server 300 may receive from the first network device 100 a data request encrypted based on the first device key 114. Thereafter, after acquiring the first device key 114 from the device database 400, the server 300 may decrypt encrypted data request transmitted from the first network device 100 based on the first device key 114, and accordingly respond to the data request.

In yet another embodiment, the present invention provides a device ID management method implemented in the first network device 100. Similarly, such device ID management method may be programmed into a computer program, which may be executed by a computing device or may be stored in a computer-readable medium and later read and executed by a computing device. Specifically, the device ID management method provides verifying whether the first network device 100 possess the first device ID 111. If negative, the device ID management method may be terminated. If negative, the device ID management method of the first network device 100 may include encrypting the first device information 112 based on the shared device key and transmitting the encrypted first device information 112 to the server 300; receiving from the server 300 a first device ID 111 and a first device key 114, whereas the first device ID 111 is unique to the first network device 100 and is generated by server 300 according to the first device information 112, and the first device key 114 is unique to the first network device 100 and is generated by server 300; storing the first device ID 111 and the first device key 114 after decrypting them based on the shared device key. In yet another embodiment, the network device 100 may encrypt a data request based on the first device key 114, and transmit the encrypted data request to the server 300. Thereafter, the first network device 100 may receive from the server 300 a data encrypted based on the first device key 114 by the server 300, and accordingly decrypt such data based on the first device key 114.

Figure 3H:
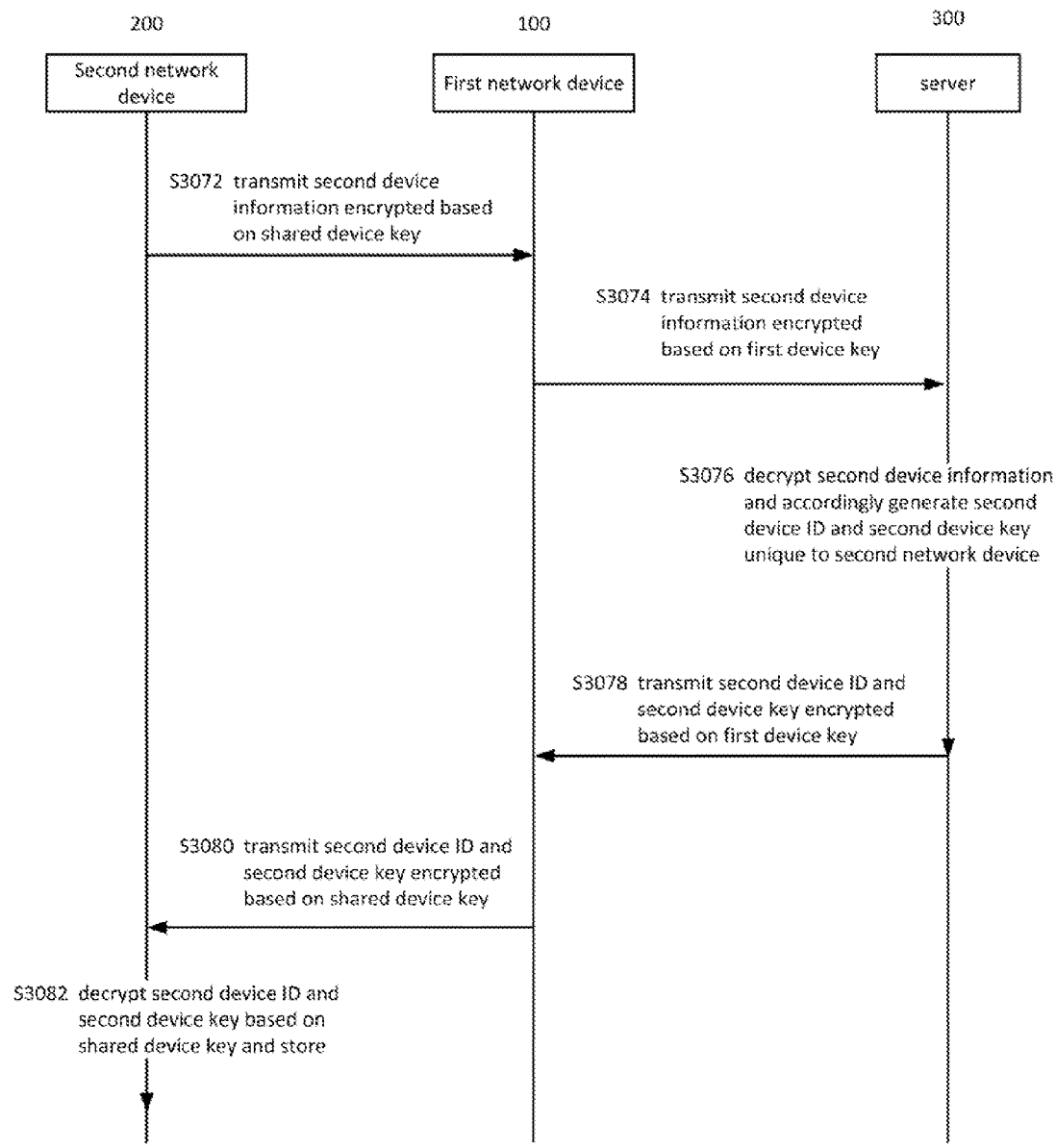

FIG. 3H illustrates another exemplary embodiment of the device ID management method. Specifically, the present embodiment may be implemented in the system disclosed in FIGS. 1F and 1G. In step S3072, the second network device 200 may encrypt the second device information 212 based on the shared device key, and transmit the encrypted second device information 212 to the first network device 100. In step S3074, the first network device 100 may decrypt the second device information 212 received based on the shared device key, and encrypt such second device information 212 based on the first device key 114 before transmitting the second device information 212 to the server 300. In step S3076, the server 300 may decrypt the second device information 212 received based on the first device key 114. Consequently, the server 300 may generate a second device ID 211 unique to the second network device 200 according to the second device information 212, and may generate a second device key 214 unique to the second network device 200. Moreover, the server 300 may store the second device ID 211 and the second device key 214. In step S3078, the server 300 may encrypt the second device ID 211 and the second device key 214 based on the first device key, and transmit the encrypted second device ID 211 and second device key 214 to the first network device 100. In step S3080, the first network device 100 may encrypt the second device ID 211 and the second device key 214 received based on the first device key 114. Consequently, the first network device 100 may encrypt the second device ID 211 and the second device key 214 based on the shared device key and transmit the encrypted second device ID 211 and the second device key 214 to the second network device 200. In step S3082, the second network device 200 may decrypt the second device ID 211 and the second device key 214 based on the shared device key and store the decrypted second device ID 211 and second device key 214. As a result, through encrypting the data transmission between the second network device 200 and the server 300 by the first network device 100, which has already acquired the first device ID 111 and the first device key 114, the security of the data transmission between the server 300 and the network devices in the device ID management method may be enhanced.

In one embodiment, the server 300 may store the second device ID 211, second device information 212 and the second device key 214 to the device database 400, and may accordingly update the device database log data 410, i.e., add the second device ID 211, second device information 212 and the second device key 214 to the device database log data 410. The first network device 100 may transmit the first device ID 111 and the encrypted second device information 212 to the server 300 so as to enable to server 300 to query in the device database 400 to acquire the first device key 114. In another embodiment, after acquiring the second device key 214, the second network device 200 may encrypt a data request based on the second device key 214 and transmit the encrypted data request to the server 300. Thereafter, the server 300 may acquire the second device key 214 from the device database 400 and decrypt the data request received from the second network device 200 based on the second device key 214. Consequently, the server 300 may respond to the data request.

In another embodiment, the present invention provides a device ID management method implemented in a server. Specifically, such device ID management method may be programmed into a computer program, which may be executed by a computing device or may be stored in a computer-readable medium and later read and executed by a computing device. The device ID management method of the server 300 may include receiving from the first network device 100 the second device information 212 encrypted based on first device key 114; decrypting the second device information 212 based on the first device key 114; generating a second device ID 211 unique to the second network device 200 according to the second device information 212; encrypting the second device ID 211 based on the first device key 114 and transmitting the encrypted second device ID 211 to the first network device 100. In addition, the server 300 may generate a second device key 214 unique to the second network device 200, encrypt such second device key 214 based on the first device key 114, and transmit such encrypted second device key 214 to the first network device 100. In yet another embodiment, the server 300 may store the second device ID 211, the second device information 212 and the second device key 214 in the device database 400. In addition, the server 300 may receive a data request transmitted from and encrypted based on the second device key 214 by the second network device 200. Thereafter, the server 300 may respond to the data request.

In yet another embodiment, the present invention provides a device ID management method implemented in the first network device 100. Similarly, such device ID management method may be programmed into a computer program, which may be executed by a computing device or may be stored in a computer-readable medium and later read and executed by a computing device. Specifically, the device ID management method provides receiving from the second network device 200 the second device information 212, which is encrypted based on the shared device key; decrypting the second device information 212 based on the shared device key, and sending the second device information 212 to the server 300 after encrypting the second device information 212 based on the first device key 114; receiving from the server 400 the second device ID 211 encrypted based on the shared device key, wherein the second device ID 211 is generated by the server 300 according to the second device information 212 and the second device ID 211 is unique to the second network device 200; decrypting the second device ID 211 based on the first device key 114, and transmitting the second device ID 211 to the second network device 200 after encrypting the second device ID based on the shared device key. In addition, the first network device 100 may receive from the second network device 200 a second device key 214 encrypted based on the first device key 114, and decrypt such second device key 214 based on the first device key 114. Thereafter, the first network device 100 may encrypt the second device key 214 based on the shared device key and transmit the encrypted second device key 214 to the second network device 200. It is to be noted that the second device key 214 is generated by the server 300, and the second device key 214 is unique to the second network device 200.

In yet another embodiment, the present invention provides a device ID management method implemented in the second network device 200. Similarly, such device ID management method may be programmed into a computer program, which may be executed by a computing device or may be stored in a computer-readable medium and later read and executed by a computing device. Specifically, the device ID management method provides encrypting the second device information 212 based on the shared device key and transmitting the encrypted second device information 212 to the first network device 100; receiving from the first network device 100 the second device ID 211 encrypted based on the shared device key, wherein the second device ID 211 is generated by the server 300 according to the second device information 212 and the second device ID 211 is unique to the second network device 200; decrypting the second device ID 211 based on the shared device key and storing the second device ID 211. In addition, the second network device 200 may receive from the first network device 100 the second device key 214 encrypted based on the shared device key. Thereafter, the second network device 200 may decrypt the second device key 214 based on the shared device key and store the second device key 214. It is to be noted that the second device key 214 is generated by the server 300, and the second device key 214 is unique to the second network device 200. In yet another embodiment, the second network device 200 may encrypt a data request based on the second device key 214, and transmit the data request to the server 300. Thereafter, the second network device 200 may receive from the server 300 data encrypted based on the second device key 214, and decrypt such data based on the second device key 214.

It is to be noted that the aforementioned device ID management method may be implemented into a computerized product by means of programming language. Examples of such include computer source code or computer-executable files. Alternatively, the aforementioned computer program may be stored in a computer-readable medium and accessed by a computing device to execute the device ID management method. Examples of computer-readable medium include ROM, RAM, EPROM, EEPROM, hard disk, solid-state disk, floppy disk, CD-ROM, DVD-ROM, or other electronic, electro-magnetic or optical recording medium.

Previous descriptions are only embodiments of the present invention and are not intended to limit the scope of the present invention. Many variations and modifications according to the claims and specification of the disclosure are still within the scope of the claimed invention. In addition, each of the embodiments and claims does not have to achieve all the advantages or characteristics disclosed. Moreover, the abstract and the title only serve to facilitate searching patent documents and are not intended in any way to limit the scope of the claimed invention.

What is claimed is:

1. A method for managing network device identification implemented in a server, the method comprising:
    receiving a first device information and a second device information from a first network device, wherein the first device information is encrypted based on a shared device key;
    generating a first device identification corresponding to the first device information, wherein the first device identification is encrypted based on the shared device key;
    generating a first device key corresponding to the first device information, and encrypting the first device key based on the shared device key;
    generating a second device identification corresponding to the second device information, wherein the second device identification is encrypted based on the first device key; and
    transmitting the first device identification, which is encrypted, and the second device identification, which is encrypted, to the first network device.

2. The method according to claim 1, further comprising:
    decrypting the first device information transmitted from the first network device based on the shared device key; and
    encrypting the first device identification generated by the server based on the shared device key.

3. The method according to claim 1, further comprising:
    receiving a first data request from the first network device, wherein the first data request is encrypted by the first network device based on the first device key;
    decrypting the first data request based on the first device key; and
    transmitting a first response to the first network device corresponding to the first data request, wherein the first response is encrypted by the server based on the first device key.

4. The method according to claim 1, further comprising:
    encrypting the second device information by the first network device based on the first device key; and
    decrypting the second device information based on the first device key.

5. The method according to claim 1, further comprising:
    generating a second device key corresponding to the second device information, and encrypting the second device key based on the first device key;
    transmitting the encrypted second device key to the first network device.

6. A method for managing network device identification implemented in a network device, comprising:
    transmitting a first device information and a second device information to a server, and requesting a first device identification and a second device identification from the server;
    receiving a first device key corresponding to the first device information generated by the server, wherein the first device key is encrypted by the server based on a shared device key; and
    receiving and storing the first device identification and the second device identification transmitted from the server, wherein the first device identification is generated by the server corresponding to the first device information, and is encrypted by the server based on the shared device key, wherein the second device identification is generated by the server corresponding to the second device information, and is encrypted by the server based on the first device key.

7. The method according to claim 6, further comprising:
    encrypting the first device information based on the shared device key before transmitting the first device information to the server; and
    decrypting the first device identification based on the shared device key after receiving the first device identification from the server.

8. The method according to claim 6, further comprising:
    receiving from the server the first device key encrypted by the server; and decrypting the first device key based on the shared device key.

9. The method according to claim 6, further comprising:
transmitting to the server a first data request, wherein the first data request is encrypted based on the first device key;
receiving from the server a first response corresponding to the first data request, wherein the first response is encrypted by the server based on the first device key; and
decrypting the first response based on the first device key.

10. The method according to claim 6, further comprising:
receiving a second device information from the second network device, wherein the second device information is encrypted by the second network device based on the shared device key;
decrypting the second device information based on the shared device key, encrypting the second device information based on the first device key, and transmitting the second device information to the server; and
decrypting the second device identification based on the first device key, decrypting the second device identification based on the shared device key, and transmitting the second device identification to the second network device.

11. A network device capable of receiving device identification, comprising:
a non-transitory computer-readable storage medium;
at least one processor;
one or more computer programs being stored in the storage medium and executed by the at least one processor, the one or more computer programs comprising:
a transmission module that transmits a first device information and a second device information to a server;
a reception module that receives a first device identification and a second device identification transmitted from the server, and transmits the first device identification to the storage medium, wherein the first device identification is generated by the server, and is encrypted by the server based on a shared device key, wherein the second device identification is generated by the server corresponding to the second device information, and is encrypted by the server based on the first device key; and
the reception module that receives from the server a first device key, wherein the first device key is generated by the server corresponding to the first device information, and is encrypted by the server based on the shared key.

12. The network device according to claim 11, the one or more computer programs further comprising:
an encrypting module that encrypts the first device information at the storage medium based on the shared device key, and transmits the first device information to the transmission module; and
a decrypting module that decrypts the first device identification received by the reception module using the shared device key, and transmits the decrypted first device identification to the storage medium.

13. The network device according to claim 11, wherein the decryption module decrypts the first device key based on the shared device key.

14. The network device according to claim 11, wherein the transmission module transmits a first data request to the server, wherein the first data request is encrypted based on the first device key, and the reception module receives from the server a first response corresponding to the first data request, wherein the first response is encrypted by the server based on the first device key.

15. A non-transitory computer-readable medium comprising instructions, which when executed by a computer system causes the computer system to perform operations for managing network device identification, the operations comprising:
transmitting a first device information and a second device information to a server and requesting a first device identification and a second device identification from the server;
receiving a first device key corresponding to the first device information generated by the server, wherein the first device key is encrypted by the server based on a shared device key; and
receiving and storing the first device identification and the second device identification transmitted from the server, wherein the first device identification is generated by the server based on the first device information, and is encrypted by the server based on the shared device key, wherein the second device identification is generated by the server corresponding to the second device information, and is encrypted by the server based on the first device key.

16. The non-transitory computer-readable medium comprising instructions according to claim 15, wherein the operations further comprise:
encrypting the first device information based on the shared device key before transmitting the first device information to the server; and
decrypting the first device identification based on the shared device key after receiving the first device identification.

17. The non-transitory computer-readable medium comprising instructions according to claim 15, wherein the operations further comprise:
receiving from the server the first device key encrypted by the server; and
decrypting the first device key based on the shared device key.

18. The non-transitory computer-readable medium comprising instructions according to claim 15, wherein the operations further comprise:
transmitting to the server a first data request, wherein the first data request is encrypted based on the first device key;
receiving from the server a first response corresponding to the first data request, wherein the first response is encrypted by the server based on the first device key; and
decrypting the first response based on the first device key.

19. The non-transitory computer-readable medium comprising instructions according to claim 15, wherein the operations further comprise:
receiving the second device information from a second network device, wherein the second device information is encrypted by the second network device based on the shared device key;
decrypting the second device information based on the shared device key, encrypting the second device information based on the first device key, and transmitting the second device information to the server; and
decrypting the second device identification based on the first device key, decrypting the second device identification based on the shared device key, and transmitting the second device identification to the second network device.

* * * * *